Oct. 14, 1941.  H. A. CEDERSTROM  2,259,149
V BELT CLUTCH PULLEY
Filed June 12, 1939  3 Sheets-Sheet 1
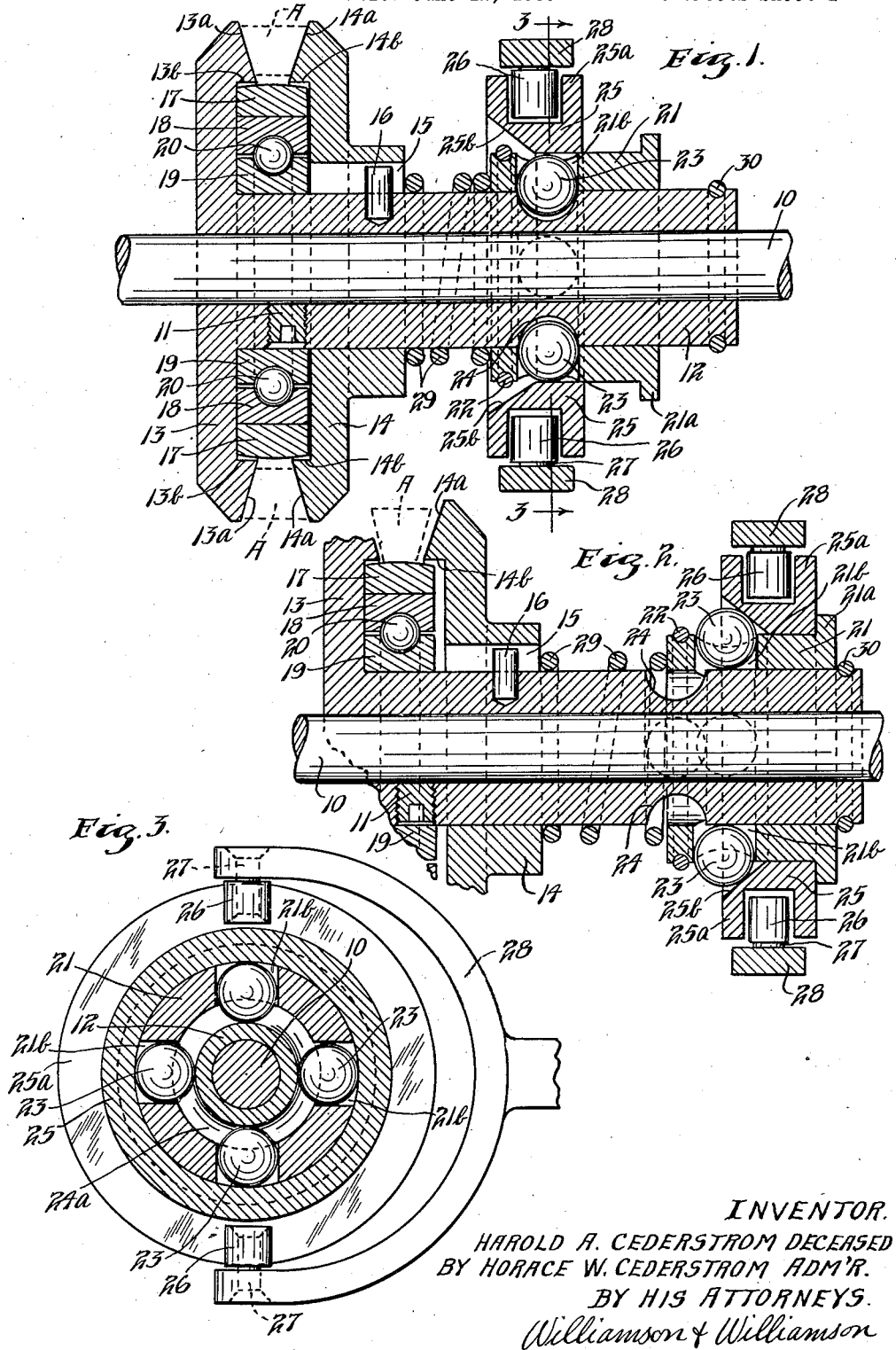
INVENTOR.
HAROLD A. CEDERSTROM DECEASED
BY HORACE W. CEDERSTROM ADM'R.
BY HIS ATTORNEYS.
Williamson & Williamson Oct. 14, 1941. H. A. CEDERSTROM 2,259,149
V BELT CLUTCH PULLEY
Filed June 12, 1939 3 Sheets-Sheet 2
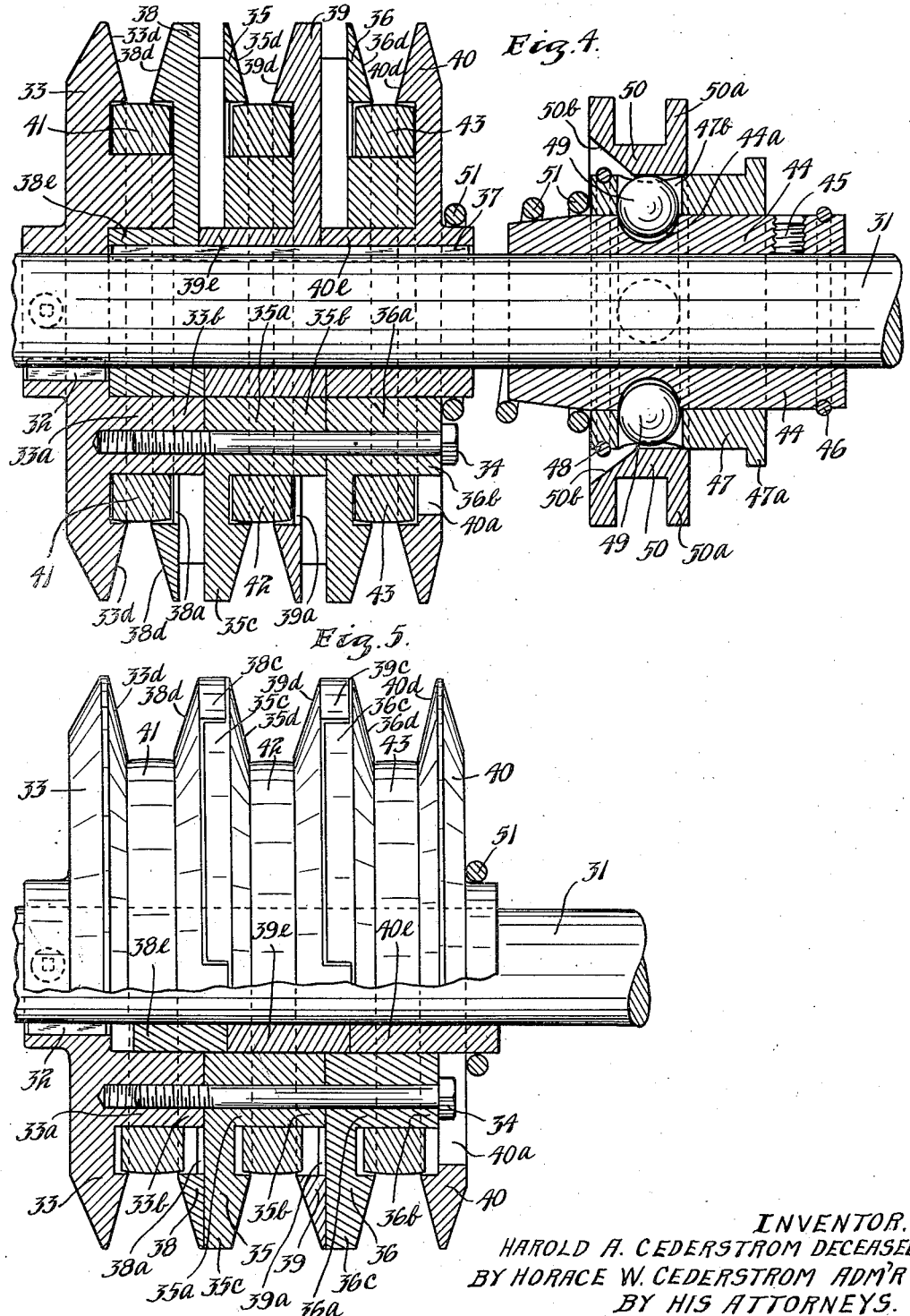
INVENTOR.
HAROLD A. CEDERSTROM DECEASED
BY HORACE W. CEDERSTROM ADM'R
BY HIS ATTORNEYS.
Williamson + Williamson

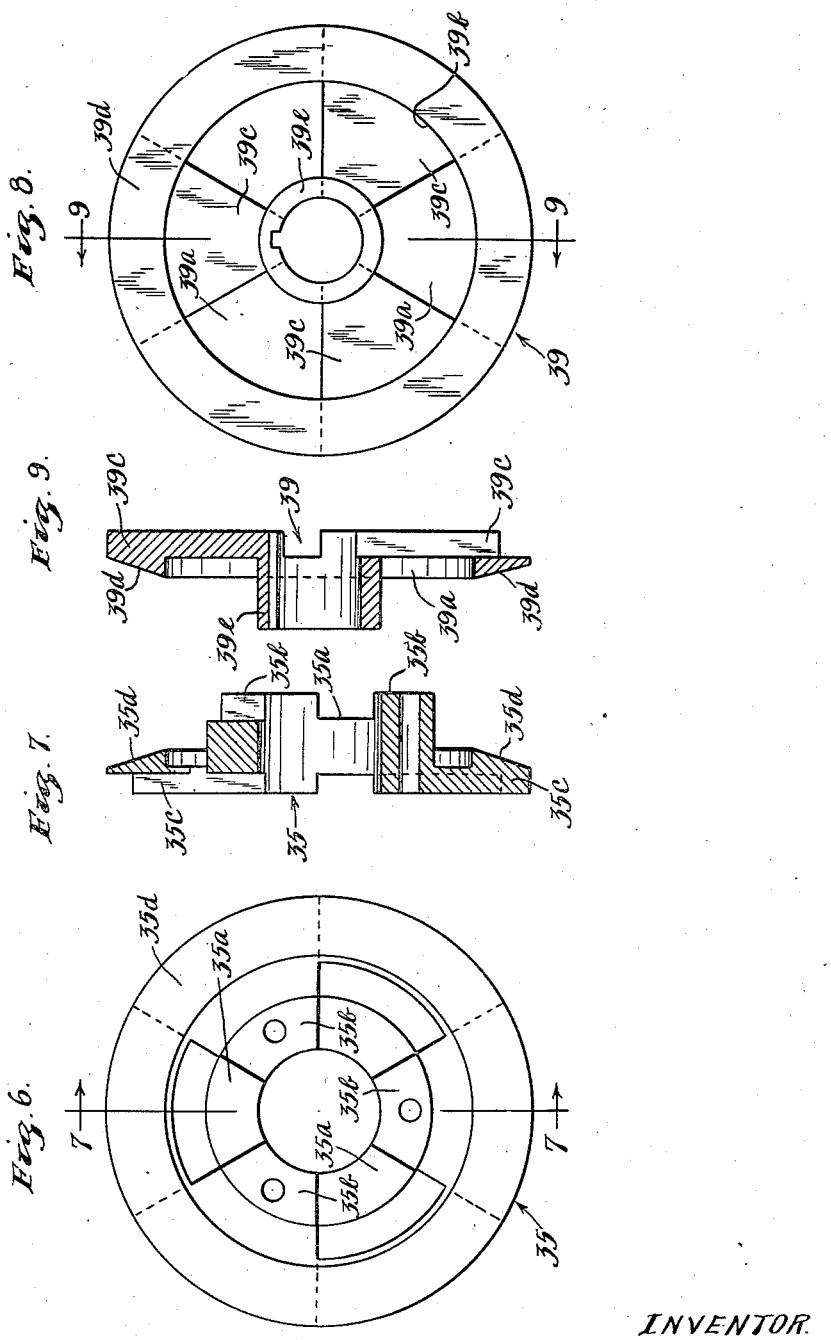

Patented Oct. 14, 1941

2,259,149

UNITED STATES PATENT OFFICE 2,259,149

V BELT CLUTCH PULLEY

Harold A. Cederstrom, deceased, late of Minneapolis, Minn., by Horace W. Cederstrom, administrator, Minneapolis, Minn.

Application June 12, 1939, Serial No. 278,730

7 Claims. (Cl. 74—216.5)

This invention relates to V belt clutch pulleys.

It is the general object of the invention to provide a novel V belt clutch pulley of inexpensive, simple and compact construction which can be utilized either as a driving pulley or a driven pulley in connection with a V belt and which if utilized as a driving pulley can when shifted to one position drive the V belt as the pulley rotates and which when shifted to another position will allow the V belt to idle while the pulley is being rotated, and which when used as a driven pulley when shifted to one position will be driven by the V belt and which when shifted to a second position will permit the V belt to turn idle without driving the pulley.

A more specific object of the invention is to provide a V belt clutch pulley which can be shifted from driving to idling relation with great ease and without materially affecting the alinement of the V belt running over the pulley.

Another object is to provide a multiple V belt clutch pulley of small, compact form for use in driving relation, or idling relation, in conjunction with a plurality of V belt drives.

A further object is to provide a simple and effective mechanism for shifting a V belt clutch pulley of the single or multiple type.

The objects and advantages of the invention will more fully appear from the following description made in connection with the accompanying drawings wherein like reference characters refer to the same or similar parts throughout the various views and in which, Fig. 1 is a vertical section taken through a V belt clutch pulley of the single type embodying the invention and showing the clutch pulley shifted to the driving position;

Fig. 2 is a similar view but showing the pulley shifted to idling relation;

Fig. 3 is a transverse section taken substantially on the line 3—3 in Fig. 1 as indicated by the arrows;

Fig. 4 is a vertical longitudinal section taken through a multiple V belt clutch pulley embodying the invention and showing the same shifted to driving relation;

Fig. 5 is a view partly in side elevation and partly in vertical section of portions of the same multiple clutch pulley but showing the same shifted to idling position;

Fig. 6 is a face view of one of the fixed discs of the multiple pulley shown in Figs. 4 and 5;

Fig. 7 is a section taken on the line 7—7 of Fig. 6 as indicated by the arrows;

Fig. 8 is a face view of one of the sliding discs of the multiple pulley shown in Figs. 4 and 5; and Fig. 9 is a section taken on the line 9—9 of Fig. 8 as indicated by the arrows.

Referring first to the embodiment of the invention shown in Figs. 1, 2 and 3 a shaft 10 is illustrated which shaft may be either a driving shaft or a driven shaft. Secured as by a set screw 11 to the shaft 10 is a sleeve 12 which carries a fixed disc 13, this disc being shown as being integrally formed with the sleeve in the illustrated embodiment. A sliding disc 14 is mounted on the sleeve 12 for rotation therewith and for sliding movement thereon within limits and for this purpose the disc 14 is equipped with a hub having a splined channel 15 therein within which a spline 16 carried by the sleeve 12 works. The two discs 13 and 14 face each other in opposing relation and the outer portions of the opposing faces of these discs are designated 13a and 14a respectively and these portions 13a and 14a extend in outwardly diverging relation from the axis of rotation of the shaft 10 and form a pulley groove within which a V belt shown in dotted lines and designated by the letter A may be received.

Inwardly from the face portions 13a and 14a, the two discs 13 and 14 are provided with recesses 13a and 14b respectively and a ring 17 located between the two discs 13 and 14 is received within the recesses 13b and 14b and forms in effect the bottom of the pulley groove. The peripheral edge of this ring is slightly crowned, as shown, and the ring is free to rotate relative to the two discs 13, 14, and the sleeve 12. While it is possible to journal the ring 17 on the sleeve 12 in any suitable manner, in the illustrated embodiment a ball bearing is used for this purpose, the outer race 18 of the ball bearing being carried by the ring 17, the inner race 19 of the ball bearing being carried by the sleeve 12 and the balls 20 of the bearing, of course, being located in the channels formed in the opposing faces of the two races 18 and 19.

To shift the sliding disc 14 a collar 21 is employed which is loosely mounted on the sleeve 12 to the right of the sliding disc 14 as viewed in the drawings. This collar has a stop flange 21a at one end thereof and is provided with a groove adjacent the other end thereof within which a split spring ring 22 is received for assembled retention purposes as will hereafter appear. The collar 21 is provided with a pluraltiy of ball recesses 21b within which balls 23 are partially received. Cooperating with the ball recesses 21b and the balls 23 to partially receive the balls is a ball groove 24 formed in the sleeve 12 and at times the balls 23 may be partially received within this ball groove 24. The depth of the groove 24 is so correlated with the thickness of the collar 21 that when the balls 23 are located as shown in Fig. 1 to be received partially within the ball groove 24 and partially within the ball recesses 21b, the balls will not project beyond the outer surface of the collar 21.

A shipper ring 25 receives the collar 21 and this shipper ring is provided with the usual peripheral groove 25a within which rollers 26 carried by pins 27 mounted on a shipper fork 28, work. By swinging the shipper fork 28, the shipper ring 25 can be slid from the position shown in Fig. 1 to the position shown in Fig. 2. The left inner edge of the ring 25, as viewed in the drawings, is chamfered to provide a cam surface 25b which at times works against the balls 23 and at the same time to provide clearance for movement of the balls 23 from the position shown in Fig. 1 to the position shown in Fig. 2.

A coil spring 29 encircles the sleeve 12 between the right end of the sliding disc 14 and the left end of the collar 21 and this spring, of course, has bearing at one end against the sliding disc 14 and at its other end against the collar 21. The spring 29 is of such length that when the parts are in the position shown in Fig. 1 the spring will exert considerable tension on the sliding disc 14 to hold it in its position as shown in Fig. 1 slid to the left, but when the parts are in the position shown in Fig. 2 the tension on the spring 29 is relieved so that it will exert no, or very little force, against the sliding disc 14 to tend to slide it to the left.

At the right end of the sleeve 12 a groove is provided receiving a split circular spring 30 which acts as a stop limiting sliding movement of the collar 21 to the right as viewed in the drawings.

Let us assume that the belt A is being driven as by another pulley and that the shaft 10 is to be driven by the belt. The parts of the V belt clutch pulley will then take the position shown in Fig. 1. The balls 23 will be partially received within the ball groove 24 of the sleeve 12 and partially received within the ball recesses 21b of the collar 21. These balls 23 will be retained in this position by the inner surface of the shipper ring 25 and, of course, the balls will act to lock the collar 21 in the position shown in Fig. 1 so that the collar cannot be slid on the sleeve 12 unless the shipper ring 25 is shifted from its position shown in Fig. 1. The spring 29, exerting its tension on the sliding disc 14, will hold the disc slid as closely to the fixed disc 13 as is possible and the size of the belt A is such relative to the particular parts of the clutch pulley for use with this belt that the groove of the pulley formed by the two discs 13 and 14 will be of such a width that the sides of the V belt A must run on the surfaces 13a and 14a without the belt striking the ring 17. Accordingly the belt A will drive the pulley and the shaft 10 will be driven. Attention should be called to the fact that if the load on the shaft 10 becomes so great that the power of the spring 29 is overcome the sliding disc 14a will automatically shift slightly to the right against the tension of the spring 29 and the V belt A will then ride down onto the ring 17 and will slip relative to the pulley formed by the discs 13 and 14 so that no damage can be done through overloading the shaft 10. This is quite an important feature of the present clutch pulley inasmuch as breakage of parts is prevented in case there is an obstruction to the movement of any part driven by the shaft 10.

When it is desirable to idle the shaft 10 while still permitting the belt A to turn it is only necessary to shift the shipper fork 28 to the right from the position shown in Fig. 1 to the position shown in Fig. 2. As the shipper fork moves to the right the ring 25 is slid relative to the collar 21 until the ring abuts the flange 21a. Thereupon the cam surface 25b of the ring overlies the balls 23 and as continued movement of the shipper ring 25 continues the collar 21 will slide to the right relative to the sleeve 12. The left hand portion of the collar 21 will cam the balls 23 out of the groove 24 to take the position shown in Fig. 2, partially received within the chamfered portion of the ring 25 and partially received within the ball recesses 21b. As the parts move to the position shown in Fig. 2 the tension on the spring 29 is relieved and the sliding disc 14 moves away from the fixed disc 13 to widen the V belt groove of the pulley. Accordingly the V belt rides down onto the surface of the ring 17 and as this ring is journaled for free rotation relative to the discs 13 and 14 and the sleeve 12, the pulley will not be driven and of course the shaft 10 will not be driven.

When it is again desired to drive the shaft 10 the shipper fork 28 is swung to the left from its position shown in Fig. 2 and as this occurs the ring 25 acting against the balls 23 slides the collar 21 with the ring until the balls 23 arrive at a point in line with the ball groove 24. The cam surface 25b of the ring 25 then forces the balls 23 into the groove 24 whereupon the ring 25 slides over the balls 23 to retain the balls in such a position that they lock the sleeve 21 from sliding movement. Movement of the collar 21 to left again places the spring 29 under tension and the sliding disc 14 is accordingly slid toward the fixed disc 13 to narrow the V belt groove of the pulley and cause the V belt A to climb from the journaled ring 17 to such a point that the sides of the V belt engage the portions 13a and 14a of the two discs to drive the pulley and shaft.

It will, of course, be seen that when the shaft 10 is used as a driving shaft for driving the V belt A from the clutch pulley, the belt A will be driven when the parts are in the position shown in Fig. 1 and the V belt A will not be driven when the parts are as shown in Fig. 2.

Referring now to the multiple clutch pulley illustrated in Figs. 4 to 8, there is shown a shaft 31 which may be either a drive shaft or a driven shaft. Secured as by a key 32 to the shaft 31 is a fixed disc 33, and secured as by bolts 34 to the disc 33 are a plurality of other fixed discs 35 and 36. It, of course, is understood that any desired number of fixed discs corresponding to discs 35 and 36 can be employed. Secured to the shaft 31 is a feather spline 37 which is received within spline grooves in sliding discs 38, 39, and 40, there being the same number of sliding discs as there are fixed discs. The disc 33 mates with the disc 38 to form a pulley, the disc 35 mates with the disc 39 to form a second pulley and the disc 36 mates with the disc 40 to form a third pulley. The two fixed discs 35 and 36 are, of course, identically similar and are very similar to the fixed disc 33 with the exception that the discs 35 and 36 instead of being fixed directly to the shaft 31, as is the disc 33, are secured to the disc 33. Also the two sliding discs 38 and 39 are identically similar and are similar to the remaining sliding disc 40 with the exception that the disc 40 has a chamfered right hand outer edge and has a somewhat elongated hub portion, while the discs 38 and 39 do not have chamfered outer edges on the right hand faces, nor are the hubs of these discs extended from the right hand faces of the discs as in the case of the disc 40. The three fixed discs 33, 35 and 36 have central ring-like flanges 33a, 35a and 36a, respectively, on which rings 41, 42 and 43, respectively, are journaled. Formed integrally with the ring-like flanges 33a, 35a and 36a, are segment-like extensions 33b, 35b, and 36b, respectively, which at times are received within segment-like openings 38a, 39a and 40a formed in the sliding discs 38, 39 and 40 respectively. The sliding discs 38, 39 and 40 have their left hand faces centrally recessed somewhat at 38b, 39b and 40b respectively, to partially receive the ring flanges 33a, 35a and 36a, respectively, of the discs 33, 35 and 36, and to also partially receive at times the rings 41, 42 and 43. The adjacent faces of the two discs 38 and 35, and the two discs 39 and 36 are provided with staggered interlocking segments 38c, 35c, 39c and 36c, respectively, for interfitting engagement at times. With this arrangement it will be seen that the various discs can be assembled together with the rings 41, 42 and 43, and that the discs 38, 39 and 40 are capable of limited sliding movement longitudinally of the shaft 31 relative to the discs 33, 35 and 36. It should be stated that the sliding discs 38, 39 and 40 have hub portions 38e, 39e and 40e, respectively, which are received respectively within a central recess in the fixed disc 33, and within central openings in the fixed discs 35 and 36.

The outer portions of the opposing faces of the discs 33 and 38, 35 and 39, and 36 and 40, extend outwardly in diverging relation from the axis of rotation of the shaft 31 and form pulley groove surfaces 33d and 38d, 35d and 39d, and 36d and 40d, respectively, for reception of V belts. The bottoms of these pulley grooves are formed by the outer surfaces of the various rings 41, 42 and 43, respectively, said surfaces being preferably crowned as shown for the purpose.

To shift the multiple clutch pulley a structure is employed which is very similar to that employed in conjunction with the single clutch pulley previously described. This structure is best shown in Fig. 4 and includes a sleeve 44, secured as by set screw 45, to the shaft 31 at the right of the multiple pulley as illustrated in the drawings. This sleeve 44 is provided with a ball-receiving groove 44a corresponding to the ball groove 24 of the previously described construction and carried in a groove near the right end of the sleeve 44 is a split spring ring 46 corresponding to the ring 30 of the previously described construction. A collar 47 corresponding to the collar 21 of the previous construction is mounted on the sleeve 44 and it has a step flange 47a at one end thereof and is provided with a groove adjacent its other end within which a split spring ring 48 is received. This collar 47 has ball recesses 47b therein within which balls 49 are partially received. A shipper ring 50 which is identical to the shipper ring 25 of the previous construction receives the collar 47 and this ring is provided with a groove 50a for taking rollers carried by the shipper fork as in the case of the previously described ring 25, and the ring 50 also is chamfered at its left inner edge to form a cam surface 50b as in the case of the previously described ring 25.

A coil spring 51 surrounding the shaft 31 reacts between the disc 40 and the left end of the collar 47 in the same manner as does the spring 29 in the previously described construction.

When the shipper ring 50 is slid to the left as shown in Fig. 4 the spring 51, exerting pressure against the disc 40 and from the disc 40 against the disc 39 and from the disc 39 against the disc 38, forces the sliding discs 38, 39 and 40 respectively toward the fixed discs 33, 35 and 36 with which they mate to maintain the pairs of discs in closely spaced relationship and thus to maintain the pulleys formed by the mating discs in driving engagement with the V belts to contact the sides of the V belts with the opposed portions 33d and 38d, 35d and 39d, and 36d and 40d of the respective pulleys. When the shipper ring 50 is slid to its extreme right hand position the tension on the spring 51 is relaxed so that the sliding discs 38, 39 and 40 may move to the position shown in Fig. 5 to widen the grooves of the pulleys and allow the V belts to drop down to ride on the journaled rings 41, 42 and 43 respectively whereupon the pulleys will no longer be in driving engagement with the belts. It should be noted that when the various belts are idling the alinement of the various belts is shifted merely a very slight distance longitudinally of the shaft 31 which is highly important in devices of this type. Also because of the use of the spring 51 which backs the disc 40 when the multiple pulley is in driving relation individual adjustment of the width of the groove in each pulley to meet the requirements of the particular belt employed is automatically secured.

Multiple pulleys for driving any desired number of belts may be made by adding additional discs 35 and 39 and an additional ring 42 for each additional pair of discs.

It will be seen that an exceedingly simple, compact and economical V belt clutch pulley has been provided which is capable of use effectively in many situations. It is also seen that an extremely simple and effective mechanism has been provided for shifting a clutch pulley. Devices of the invention have been successfully demonstrated in actual practice and have been found to be successful for the purpose intended.

It will of course be understood that various changes may be made in the form, details, arrangement and proportions of the various parts without departing from the scope of the present invention which generally stated consists in the matter shown and described and set forth in the appended claims.

What is claimed is:

1. A multiple V belt clutch pulley comprising a plurality of pairs of V belt pulley discs, the discs of adjacent pairs being independent of each other and having no connection and one disc of each pair being mounted for limited sliding movement to and from the other disc of the pair, the outer facing portions of each pair of discs combining to form a V belt pulley groove, a ring journaled between the two discs of each pair for free rotation relative to the same and forming the bottom of the pulley groove produced by the pair of discs, means for maintaining all the sliding discs in closely spaced relation relative to the remaining discs of the pairs, and means for rendering said first mentioned means inactive to permit sliding movement of the sliding discs away from the remaining discs of the pairs.

2. A multiple V belt clutch pulley comprising a plurality of pairs of V belt pulley discs, one disc of each pair being mounted for limited sliding movement to and from the other disc of the pair, and the other disc of each pair being non-slidable, the outer facing portions of each pair of discs combining to form a V belt pulley groove, a ring journaled between the two discs of each pair for free rotation relative to the same and forming the bottom of the pulley groove produced by the pair of discs, resilient means normally urging the sliding discs of each pair toward the remaining discs thereof, and means for rendering said resilient means inactive.

3. A multiple V belt pulley clutch comprising a shaft, a plurality of pairs of V belt pulley discs, one disc of each pair being mounted for limited sliding movement to and from the other disc of the pair, and the other disc of each pair being mounted to prevent sliding movement relative to the shaft, the outer facing portions of each pair of discs combining to form a V belt pulley groove, all of said discs being mounted for rotation with said shaft, a ring journaled between the two discs of each pair for free rotation relative to the same and forming the bottom of the pulley groove produced by the pair of discs, resilient means for urging all of said sliding discs toward the cooperating discs of said pairs and means for rendering said last mentioned means inactive, said sliding disc having portions slidably recessed between adjacent discs with which said sliding discs cooperate.

4. A multiple V belt pulley clutch comprising pairs of adjacent fixed and sliding pulley discs, means for securing one of said fixed discs to a shaft, removable means for securing said fixed discs together and permitting assembly of a sliding disc between adjacent fixed discs, each pair of fixed and sliding discs cooperating to form a V belt pulley groove, a plurality of rings one of which is journaled for rotation relative to said pulley discs between the two discs of each pair and which rings form the bottoms of said grooves, means for simultaneously shifting all of said sliding discs to and from said fixed discs and means for sliding said sliding discs to positions closely adjacent said fixed discs.

5. In a V belt clutch pulley including a fixed pulley disc and a sliding pulley disc, means for moving and latching the sliding disc comprising a grooved rotatable member located at one side of the sliding disc, a collar journaled on said member and having ball receiving recesses therein, a spring bearing at one end against said collar and adapted to bear at its other end against said sliding disc, balls carried within said ball recesses and adapted to be partially received at times within the groove of said member, said balls being so proportioned relative to said groove and to said recesses that when they are partially received within said groove they will not project beyond the periphery of said collar, a shipper ring slidably mounted on said collar for shifting movement over said recesses and laterally thereof, said shipper ring being chamfered at one inner edge to form a ball camming surface and space within which the balls may be partially received when said shipper ring is shifted to one side of said recesses, means limiting the sliding movement of said shipper ring, and means for sliding said shipper ring.

6. A V belt pulley clutch comprising a shaft, a fixed pulley disc secured thereto, a slidable pulley disc mounted for rotation with said shaft and for sliding movement thereon to and from said fixed disc, said two discs having opposed outwardly diverging face portions to form a V belt pulley groove, a ring journaled on said shaft between said two discs and having a peripheral surface forming the bottom of said groove, a collar mounted for sliding movement on said shaft, said collar having radial ball receiving recesses therein, balls carried within said recesses, said shaft having a ball receiving groove therein, a coil spring surrounding said shaft and disposed between said collar and said slidable disc, a shipper ring overlying said collar and of less width than said collar, said shipper ring having at one side thereof a ball camming portion acting to cam the balls into said groove when said shipper ring is slid in one direction, means limiting the sliding movement of said shipper ring relative to said collar and means limiting the sliding movement of said collar away from said sliding disc.

7. A multiple V belt clutch pulley comprising a plurality of pairs of V belt pulley discs, one disc of each pair being mounted for limited sliding movement to and from the other disc of the pair, and the other disc of each pair being non-slidable, the outer facing portions of each pair of discs combining to form a V belt pulley groove, a ring journaled between the two discs of each pair for free rotation relative to the same and forming the bottom of the pulley groove produced by the pair of discs, means for maintaining all of the sliding discs in closely spaced relation relative to the remaining discs of the pairs, and means for rendering such first mentioned means inactive to permit sliding movement of the sliding discs away from the remaining discs of the pairs.

HORACE W. CEDERSTROM,
*Administrator of the Estate of Harold A. Cederstrom, Deceased.*